(12) United States Patent
Huang

(10) Patent No.: US 7,066,678 B2
(45) Date of Patent: Jun. 27, 2006

(54) LOCKING METHOD AND MECHANISM

(75) Inventor: Wei-Chia Huang, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 4 days.

(21) Appl. No.: 10/714,965

(22) Filed: Nov. 18, 2003

(65) Prior Publication Data

US 2005/0117965 A1 Jun. 2, 2005

(51) Int. Cl.
*F16B 7/04* (2006.01)

(52) U.S. Cl. ............... 403/321; 403/325; 403/377; 403/328; 292/150; 292/177; 292/179

(58) Field of Classification Search ............ 403/109.1, 403/109.7, 321, 322.1, 322.4, 109.8, 325, 403/377, 328; 292/150, 177, 179, 137, 302
See application file for complete search history.

(56) References Cited

U.S. PATENT DOCUMENTS 306,286 A * 10/1884 Sawtelle ................. 292/162
2,570,390 A * 10/1951 Schuldt ................... 292/335
2,734,764 A * 2/1956 Angelo .................... 292/333
4,597,599 A * 7/1986 Bisbing ................... 292/174
4,767,139 A * 8/1988 Hansing ................... 292/162
5,281,044 A * 1/1994 Chen ....................... 403/328
5,681,257 A * 10/1997 Letourneur ............... 403/327
6,007,119 A * 12/1999 Roth et al. ............... 292/251.5
6,250,842 B1 * 6/2001 Kruger ..................... 403/315

* cited by examiner

Primary Examiner—Daniel P. Stodola
Assistant Examiner—Ernesto Garcia
(74) Attorney, Agent, or Firm—Rabin & Berdo, P.C.

(57) ABSTRACT

A locking method and device applicable to lock a linearly retractable device includes a locking plate in a first direction and a second direction perpendicular to each other. In the first direction, the locking plate is movable in a release position and a safety position. In the second element, the locking plate is movable in a latched and an unlatched position. When the locking plate is in the safety position, it is unmovable from the latched position to the unlatched position so as to prevent any unintentional force to release the lock.

3 Claims, 18 Drawing Sheets

LOCKING METHOD AND MECHANISM

BACKGROUND OF THE INVENTION

1. Field of the Invention

The invention generally relates to a locking method and mechanism for a retractable device for connecting a member, and adjusting the relative linear position of the member.

2. Related Art

Many kinds of retractable devices are used in common apparatus, including machines, home appliances and electronic products, for user to adjust some components to their suitable positions for use.

For example, many computer monitors have been replaced from prior bulky CRT (cathode ray tube) to current flat panel LCD (liquid crystal display). CRT is heavy and usually mounted on a pivotal base for angular adjustment only. LCD is compact and light so the base of a LCD panel is not only provided with angular adjustment, but also provided with height adjustment.

A conventional LCD supporting member mainly includes a base and a supporting rod. The rod supports the LCD panel in a retractable manner. A spring is included in the rod for extending the length of the rod during adjustment. When being packed, the rod is retracted into the base to save space for easier delivery. In order to prevent the rod suddenly extrude from the base, a latch is usually provided at the base for locking the rod in position when being retracted. However, the latch is easy to be released unintentionally during delivery by some external force. The rod may not fully extend because of being packed, but it will suddenly burst out and hurt people when being unpacked. Another accident is that, during use, the latch being unintentionally moved by user and suddenly extends to hurt the user.

There is also a kind of safety latch or switch for locking the latch. The user has to release the safety latch before operate the main latch for releasing the movable mechanism. However, the double latch system is not convenient for use.

As described above, a conventional retractable supporting member for LCD panel may has only one latch for fixing the position of adjusted element. The one latch device cannot prevent unintentional release of the latch and may cause accident. Though conventional retractable supporting member may have additional safety latch for locking the main latch, the operation is not easy for users.

SUMMARY OF THE INVENTION

The member of the invention is to provide a locking method and mechanism for a retractable device so as to prevent unintentional release and prevent from inconvenient double latches.

A locking method according to the invention includes the following steps. Providing a two-dimensionally movable locking plate that is selectively movable in a first direction of a release position and a safety position; and selectively movable in a second direction of a latched position and an unlatched position. On the release position, the locking plate is movable between the latched position and the unlatched position. On the safety position, the locking plate cannot be moved from the latched position to the unlatched position. Applying a resilient force in the first direction to move the locking plate to the safety position. And, applying a gravitational force in the first direction to move the locking plate to the release position. Therefore, the locking plate is kept in the safety position when no gravitational force applies to, and any external force cannot move the locking plate in the second direction.

A locking mechanism according to the invention is applicable to a retractable device. The retractable device includes a first element and a second element that are linearly movable with each other for changing their relative distance. A first spring is mounted between the first and the second elements for normally extending the two elements to their utmost distance. The locking mechanism locates at one end of the first element. A locking plate is movable in a first (axial) direction and a second (radial) direction so as to be changed in the axial direction between a release position and a safety position; and in the radial direction between a latched position and an unlatched position. A second and a third springs are applied to the locking plate for applying radial and axial forces to the locking plate and normally maintaining the locking plate in the release position and latched position. At least a hook is formed on one end of the second element and corresponding to the locking plate. When the first and second elements are retracted to the least distance, the hook passing through the locking plate is latched by the locking plate with a radial force. At least a stopping rod is formed on the first element for limiting radial movement of the locking plate so that the first and second elements are kept in the retracted condition. The two elements cannot be released even when an exposed button connected to the locking plate is pressed unintentionally.

To unlatch the locking plate, the locking plate has to be first released from the stopping rod by an axial force, and movable in radial direction to unlatch the hook of the second element. Then, the second element is released from the first element.

Practically, a retractable device using the locking mechanism of the invention is applicable to an LCD panel. When the second element is retracted in the first element and latched by the locking plate, pressing the button cannot move the locking plate to release the second element from the first element if there is no axial force applying on the second element. When an LCD panel is fixed to the second element, the weight (gravitational force) of the LCD panel provides an axial force countering the resilient force of the spring mounted between the first and second elements. So that the locking plate can be moved in radial direction by force of the second spring. Then, a user can press a button to counter the force of the first spring and to move the locking plate release the hook so as to release the second element from the first element. In appearance, the invention only includes a simple button, however, through the two-dimensionally movable locking plate, the button provides double-latch safety function.

The locking method and mechanism of the invention is applicable to a retractable device. In appearance, it provides a button for releasing the locking status. When there is no additional force applies to the device that is being locked, pressing the button cannot release the lock. Therefore, unintentional touch to the button cannot release the lock so that operational safety to users is assured.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

Figure 1:
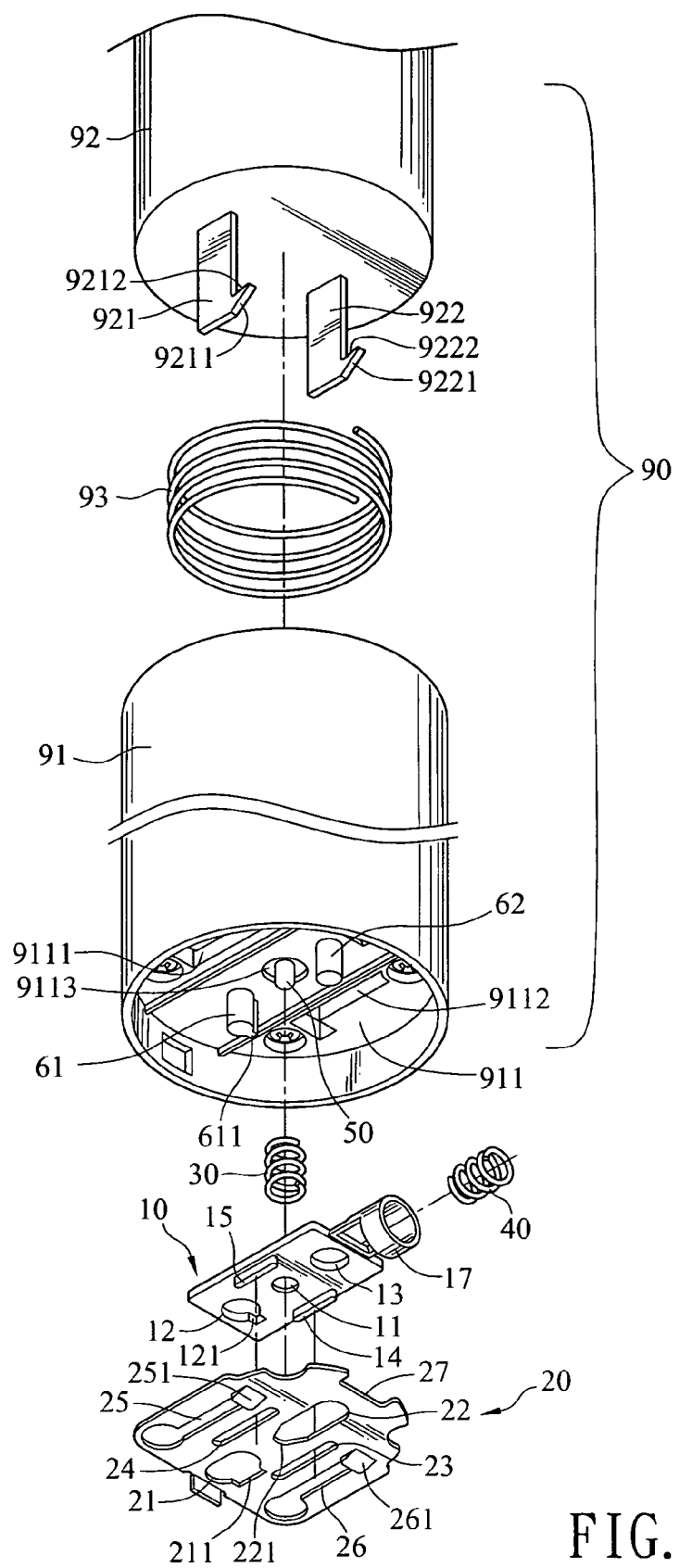
FIG. 1 is an exploded view of a locking mechanism of the invention.

A locking method and mechanism for locking a retractable device according to the invention is applicable to a retractable device. The retractable device supports a detachable member. When being attached, the detachable member can be easily moved and fixed through the locking mechanism. When being detached, the retractable device is retracted and safely latched by the locking mechanism for easier storage or delivery. The detachable member is usually an LCD panel, a speaker, a tablet or the like. As shown in FIG. 1, a retractable device 90 includes a first element 91, a second element 92 and a spring 93. The first element 91 is a cylindrical element having a front end and a rear end. The second element 92 is a cylindrical element corresponding to the first element 91 and having a connection end and an insertion end. The outer diameter of the second element 92 is similar but smaller than the inner diameter of the first element 91 so that the insertion end can fit into the front end of the first element 91 and the first and the second element 91, 92 are linearly movable for adjusting the relative position. A first spring 93 is mounted in the first element 91 and pushing the second element 92 to keep the first and the second elements 91, 92 at their utmost distance normally. The second element 92 retracted only when an external force applies against the force of the first spring 93. There are two hooks 921, 922 extending from the insertion end of the second element 92 for being locked by the locking mechanism of the invention. There is a partition 911 formed on rear end of the first element 91 for touching the first spring 93. Two holes 9111, 91112 are formed on the partition 911 for the hooks 921, 912 to pass through. For an easier description, the axial direction of the first and second elements 91, 92 is defined as first direction; and their radial direction is defined as second direction. The first and second directions are thus perpendicular to each other.

Figure 2:
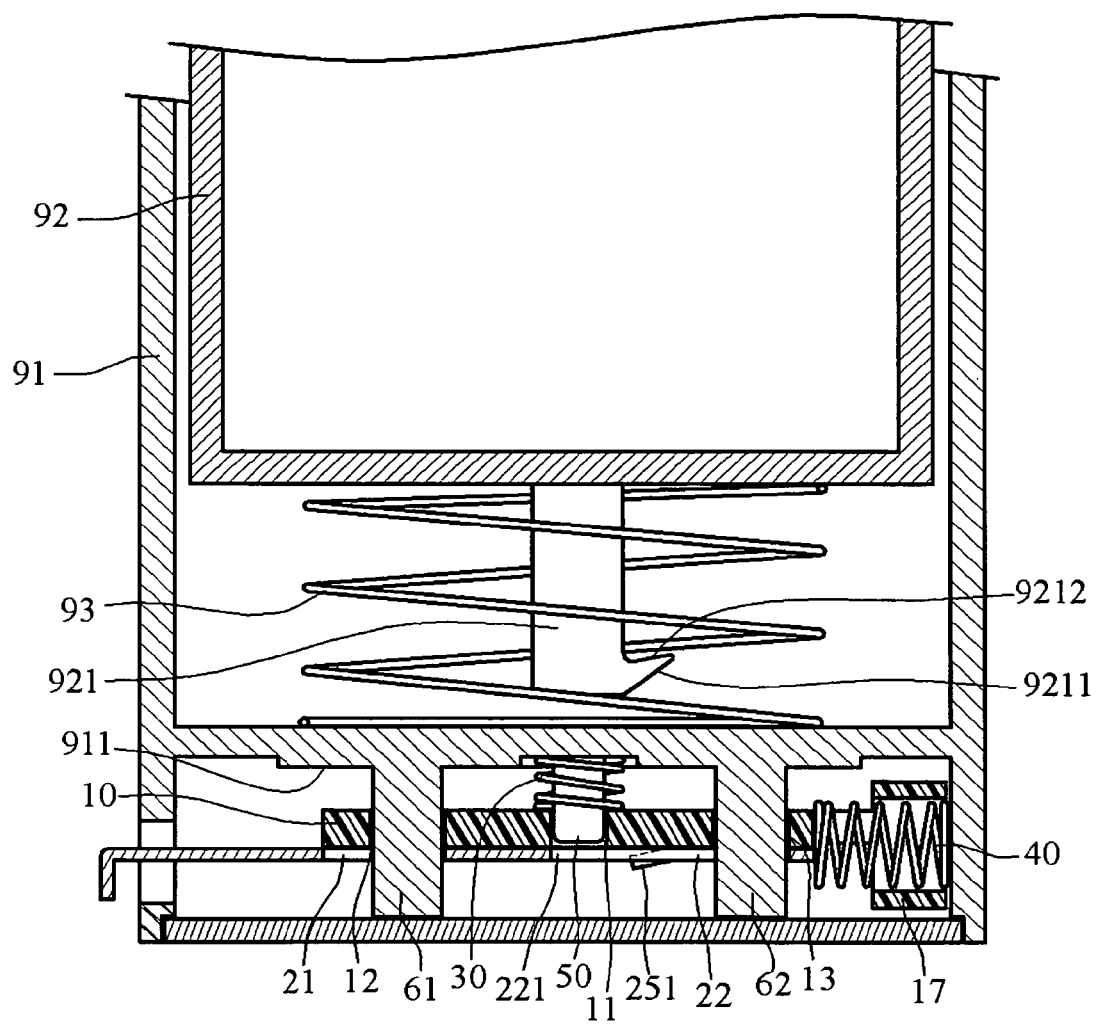
FIG. 2 is a sectional view of a locking mechanism of the invention.
Figure 3:
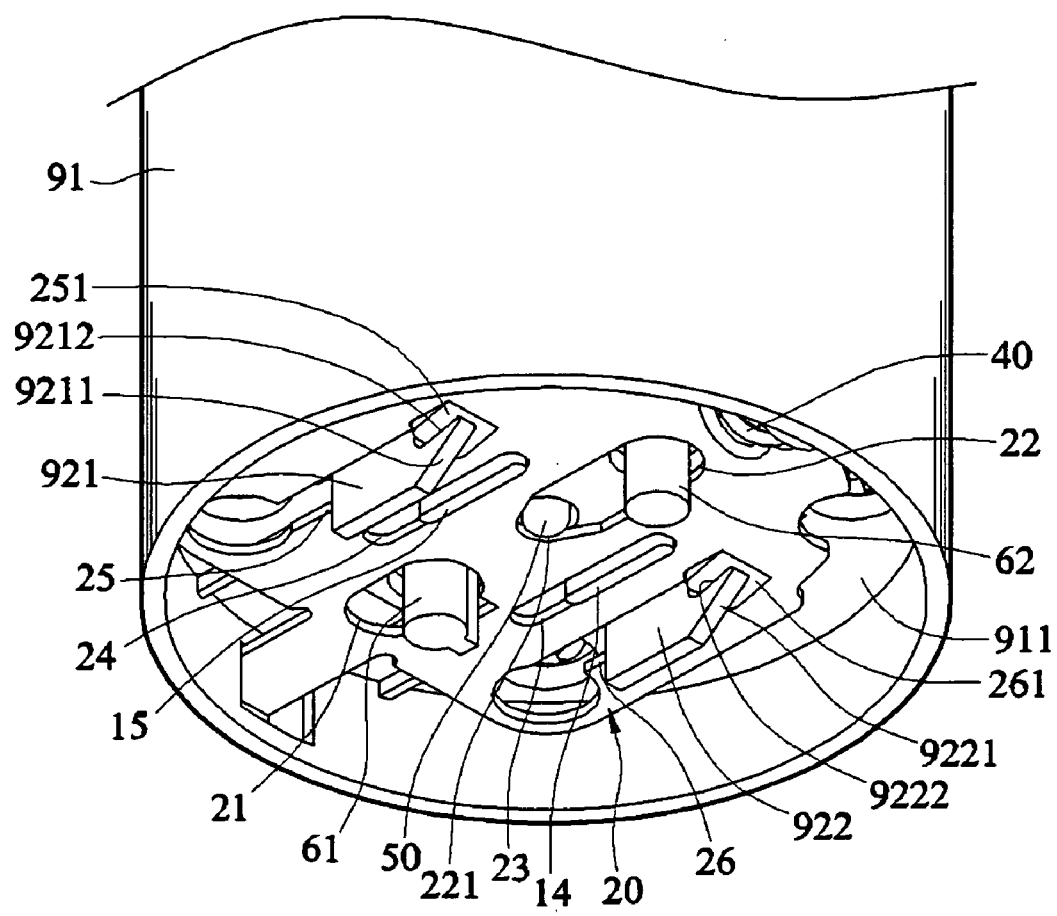
FIG. 3 is a partial perspective view of a locking mechanism of the invention.
Figure 4A:
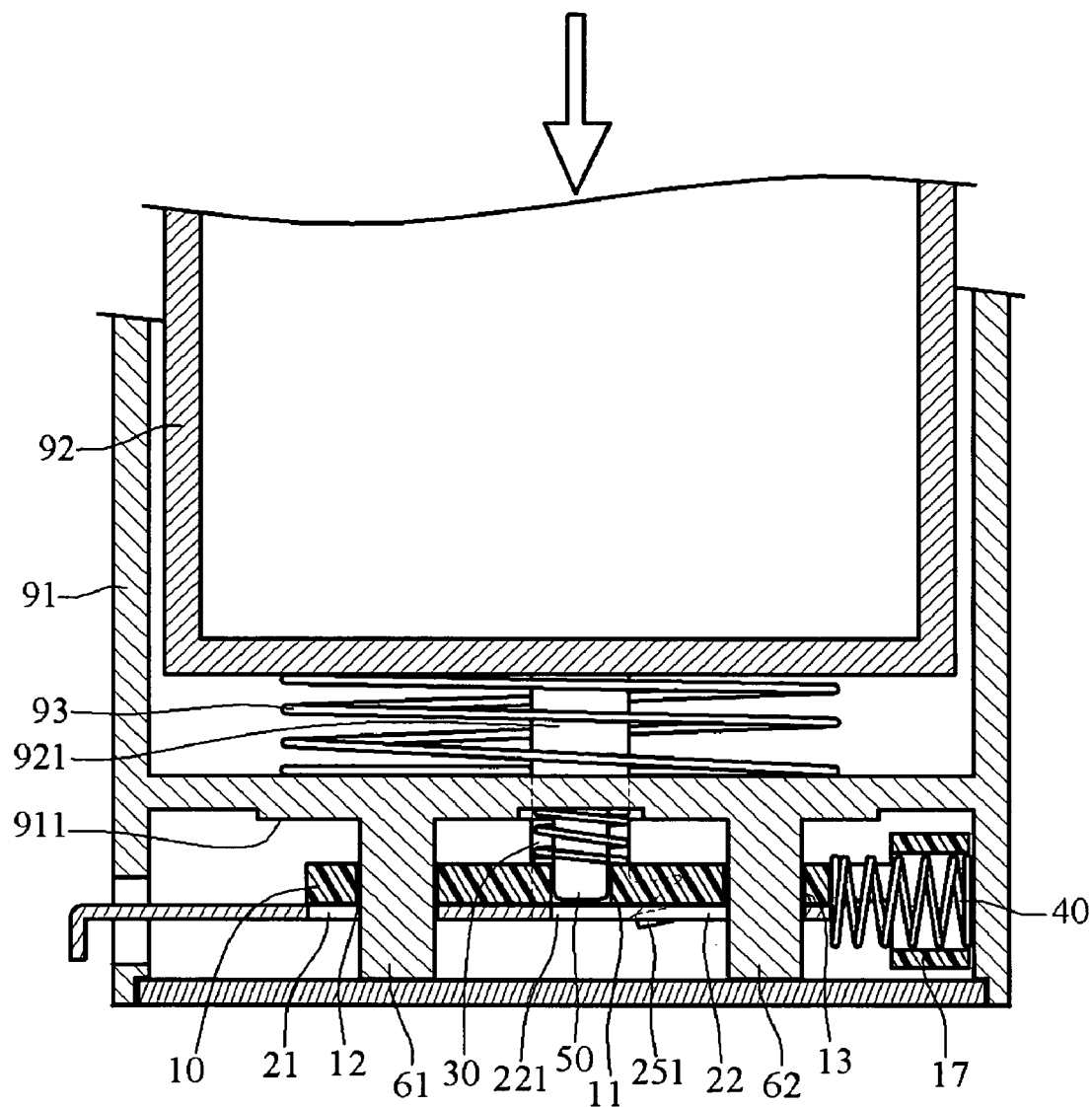
FIG. 4A is an operational and sectional view of a locking mechanism of the invention in which two elements are changing their relative distance.
Figure 4B:
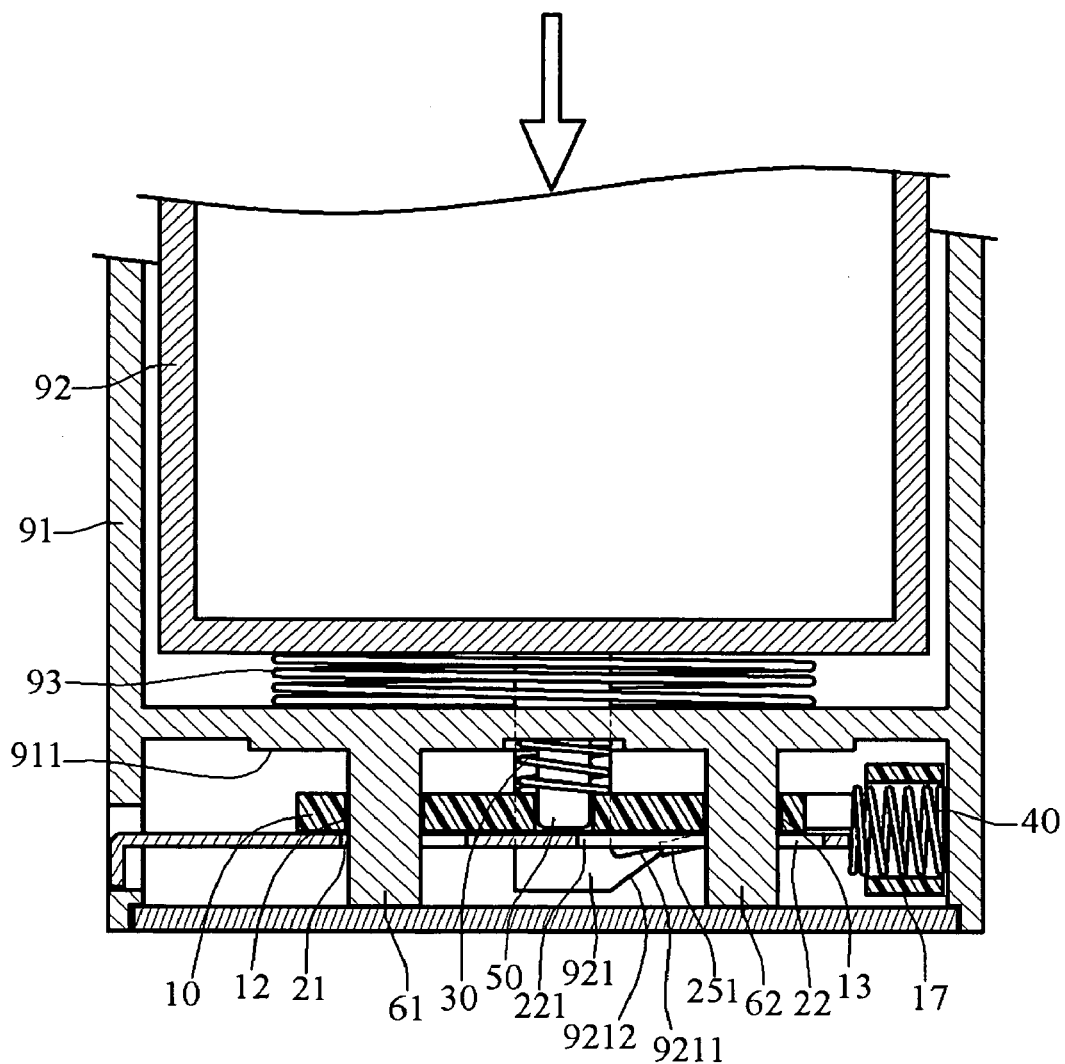
FIG. 4B is a functional view of a locking mechanism of the invention in which the second element is retracted and the locking plate is in a release position.
Figure 4C:
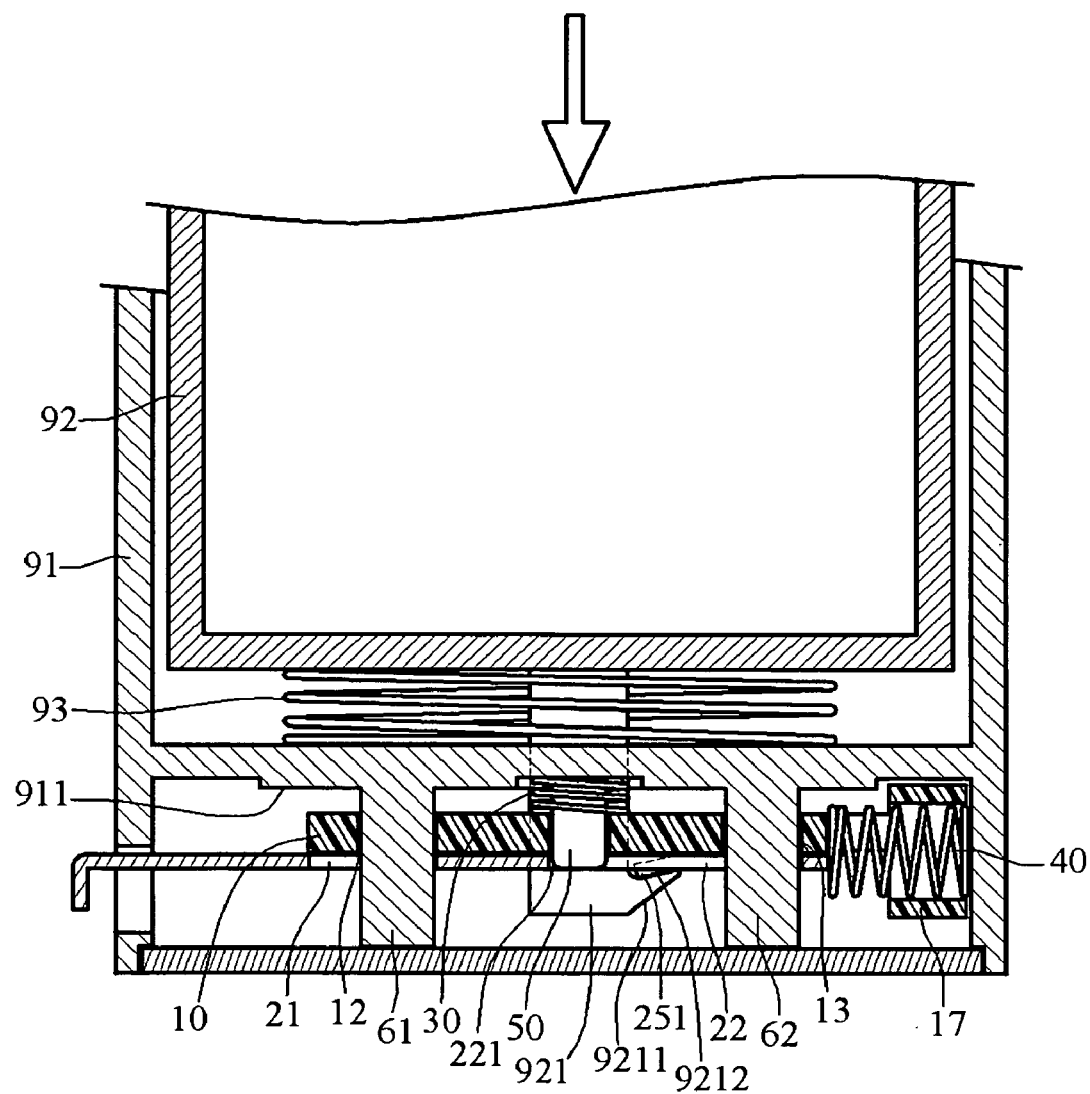
FIG. 4C is a functional view of a locking mechanism of the invention in which the second element moves the locking plate to a safety position.
Figure 4D:
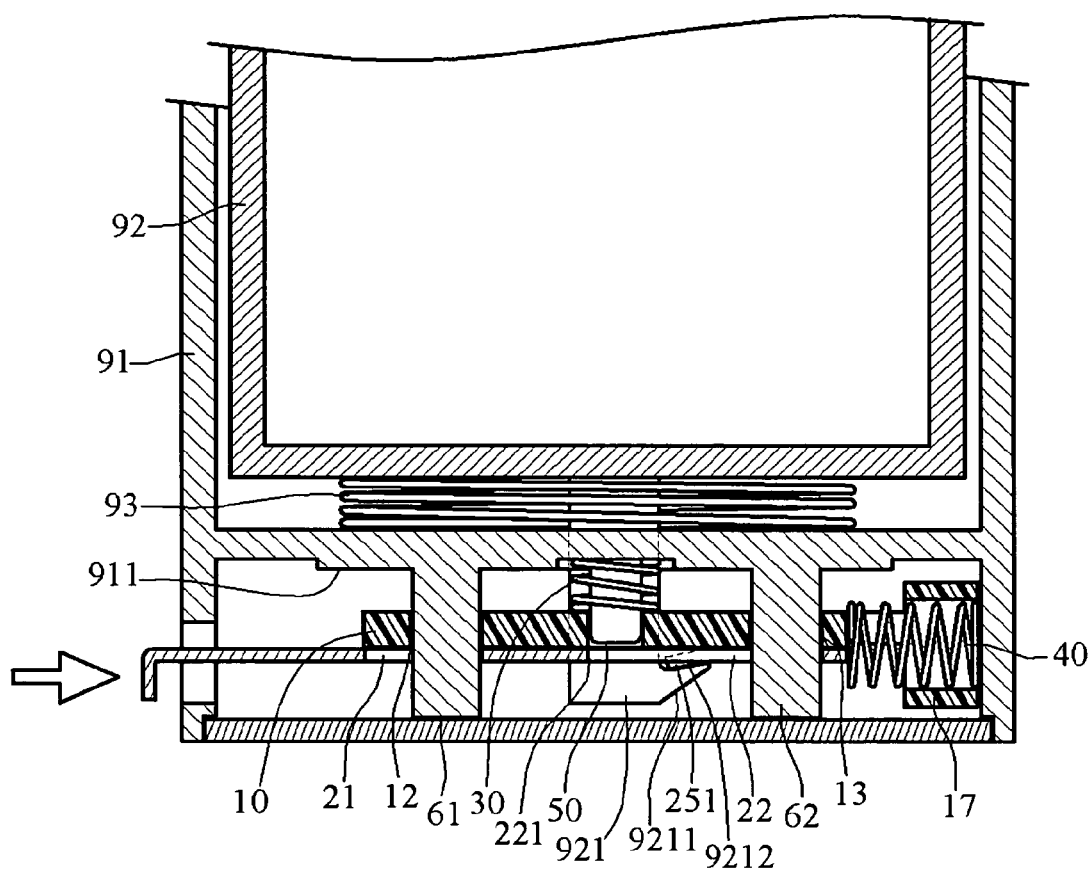
FIG. 4D is a functional view of a locking mechanism of the invention in which the second element is further retracted by gravitational force and moved the locking plate to a release position.
Figure 4E:
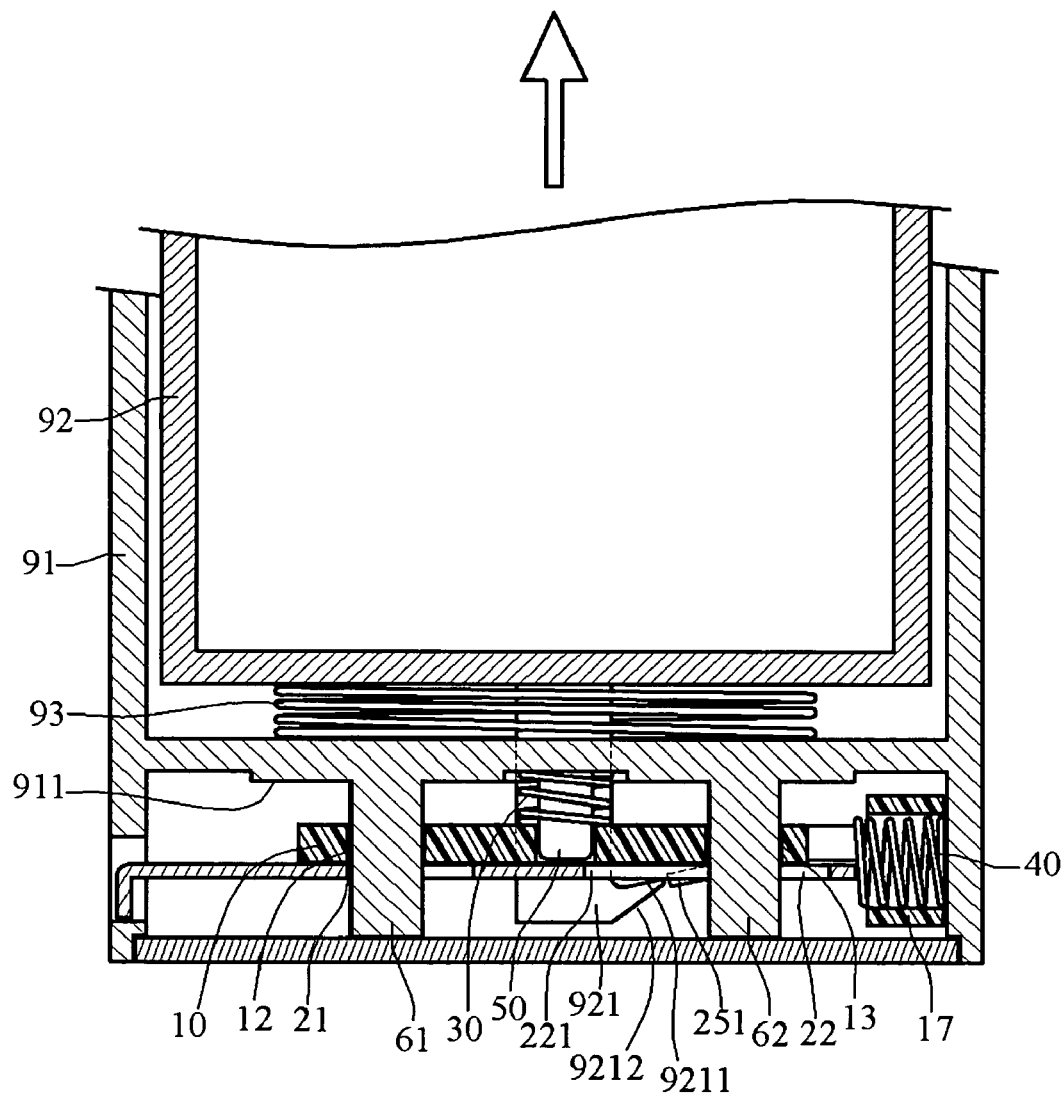
FIG. 4E is a functional view of a locking mechanism of the invention in which the locking plate moved by external force to a release position.
Figure 4F:
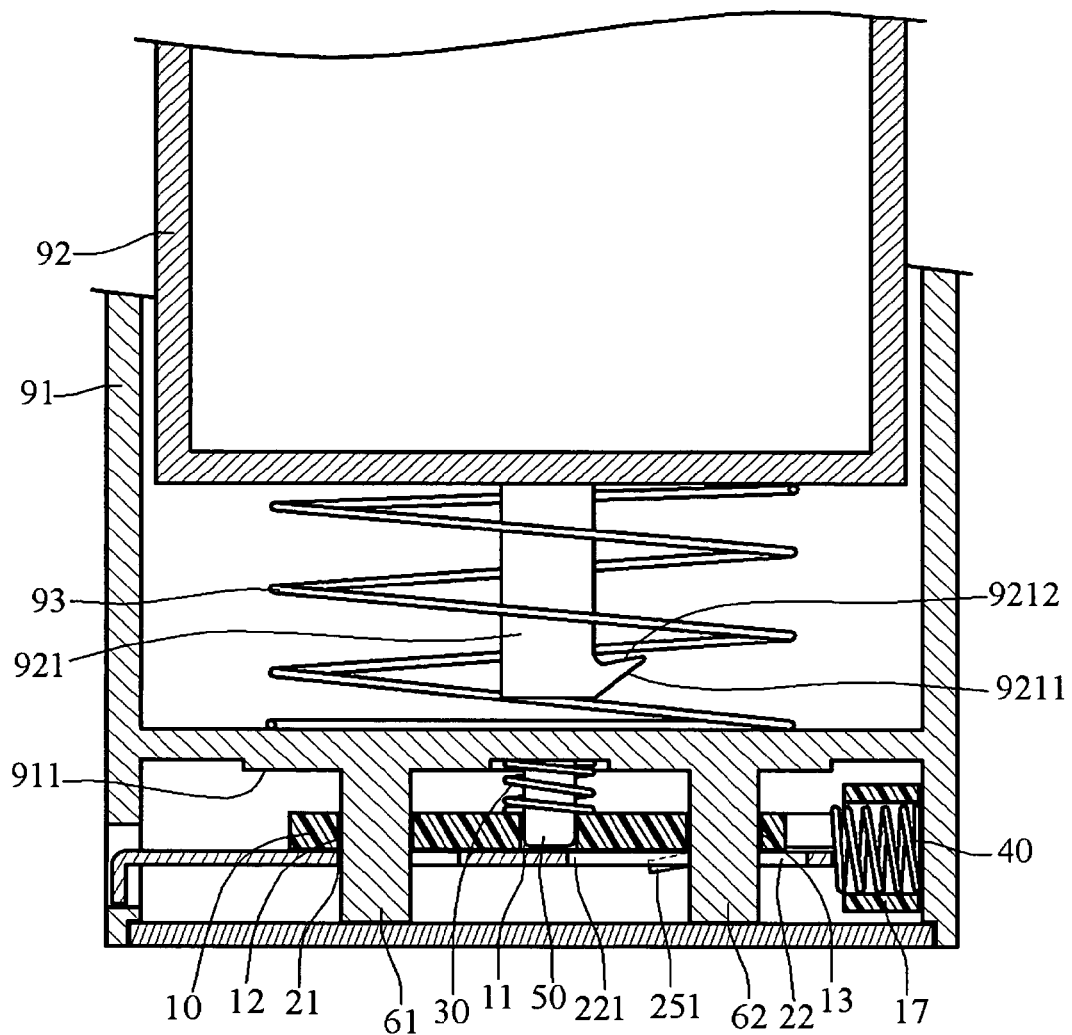
FIG. 4F is a functional view of a locking mechanism of the invention in which the second element is extended relatively to the first element by resilient force.

As shown in FIGS. 2 and 3, a locking mechanism of the invention includes a guide plate 10, a locking plate 20, a second spring 30, a third spring 40, a stopping rod 50 and a pair of guiding rods 61, 62. The stopping rod 50 and the guiding rods 61, 62 are mounted on the partition 911 of the first element 91 and extending in the first direction. The stopping rod 50 locates between the guiding rods 61, 62. Length of the stopping rod 50 is less than that of the guiding rods 61, 62.

The guide plate 10 is a rectangular plate made of polymer material or the like. The guide plate 10 is formed with a hole 11 corresponding to the stopping rod 50, and two holes 12, 13 corresponding to the guiding rods 61, 62. One surface of the guide plate 10 is also formed with two rails 14, 15 extending in the first direction.

The locking plate 20 is a metallic plate having holes 21, 22 corresponding to the guiding rods 61, 62. One end of the hole 22 extends till corresponding to the stopping rod 50 and defined a stopping portion 221. The locking plate 20 is formed with rail slots 23, 24 corresponding to the rails 14, 15; and two locking holes 25, 26 corresponding to the hooks 921, 922. There are slopes 251, 261 formed on ends of the locking holes 25, 26 in the first direction.

The second spring 30 presses against the partition 911 in the first direction. The stopping rod 50 and the guiding rods 61, 62 are corresponding to the holes 11, 12, 13 of the guide plate 10. The rails oppose to the mounting direction of the guide plate 10 so that the guide plate 10 passes through the stopping rod 50 and the guiding rods 61, 62. The second spring 30 presses on the guide plate 10. The holes 21, 22, rails 23, 24 and locking holes 25, 26 of the locking plate 20 are corresponding to the holes 12, 13, rails 14, 15 and hooks 921, 922. The slopes 251, 261 oppose to the mounting direction. The locking plate 20 passes through the guiding rods 61, 62 and touches the guide plate 10. The rails 14, 15 of the guide plate 10 then get into the rail slots 23, 24 so that the locking plate 20 is movable in the second direction along the rails 14, 15. The guide plate 10 and the locking plate 20 are also movable in the first direction along the guiding rods 61, 62. Therefore, the locking plate 20 are two-dimensionally movable. The third spring 40 is pressed in the second direction and on one side of the locking plate 20.

As shown in FIGS. 4A, 4B, 4C, 4D, 4E and 4F, by means of the second spring 30 and the third spring 40, in the first direction, the locking plate 20 has at least a release position where the second spring 30 is not pressed, and a safety position where the second spring 30 presses the locking plate 20 moving toward the stopping rod 50. Also, in the second direction, the locking plate 20 has at least a latched position where the third spring 40 is not pressed, and an unlatched position where the third spring 40 is pressed. The length of the second spring 30 pluses the thickness of the guide plate 10 must be larger than the length of the stopping rod 50. Therefore, in the release position, the stopping rod 50 does not move into the locking plate 20, the locking plate 20 is movable in the second direction between the latched position and the unlatched position by an external force. When at the safety position, the stopping rod 50 gets into the hole 22 of the locking plate 20 and touches the stopping portion 221 so that the locking plate 20 is held in the latched position and unmovable in the second direction.

The locking plate 20 is normally located in the release position in the first direction, and in the latched position in the second direction. When an external force applies and moves the second element 92 pressing the first spring 93 along the first direction and retracting into the first element 91, the hooks 921, 922 of the second element 92 pass through the holes 9111, 9112 of the partition 911, the guide plate 10 and then the locking holes 25, 26, and locks on the slopes 251, 261. After the external force releases, the retrieval force of the first spring 93 pulls he locking plate 20 to the safety position where the stopping rod 50 gets into the hole 22 and touches the stopping portion 221. Therefore, the locking plate 20 is held in the latched position and unmovable in the second direction even when any unintentional force or unsuitable force applies on the locking plate 20. To release the latched condition, an external force has to be further applied for moving the second element 92 in the first direction toward the first element 91. Then the second spring 30 pushes the locking plate 20 to the release position where the locking plate 20 is released from the stopping rod 50 and movable again in the second direction. When another external force applies on the locking plate 20 to move it from the latched position to the unlatched position, the hooks 921, 922 are released from the locking plate 20. Then, the first element 92 extends from the first element 91 in the first direction by means of the retrieval force of the spring 93.

Figure 5:
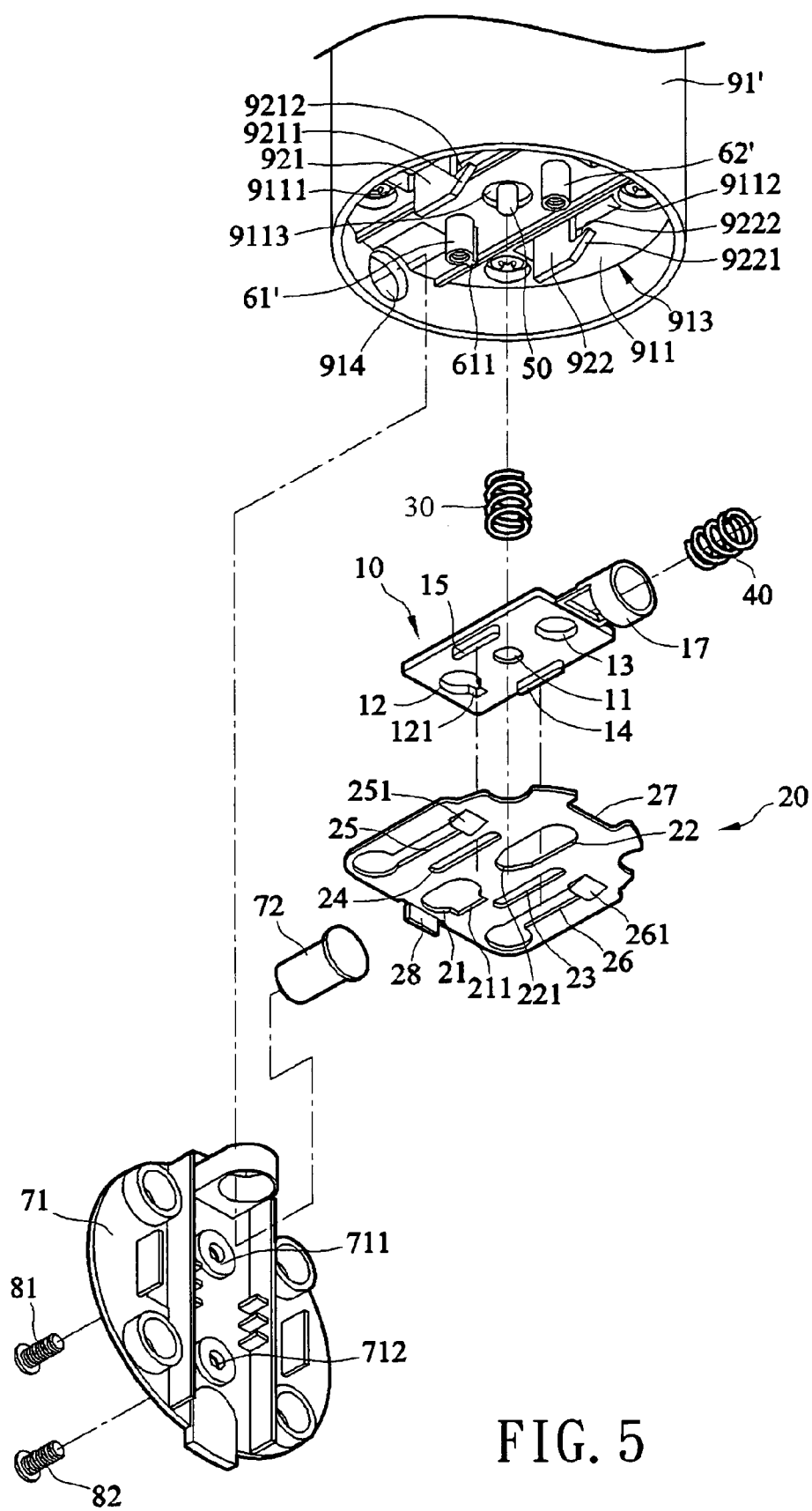
FIG. 5 is an exploded view of a mechanism using a locking mechanism of the invention.
Figure 6:
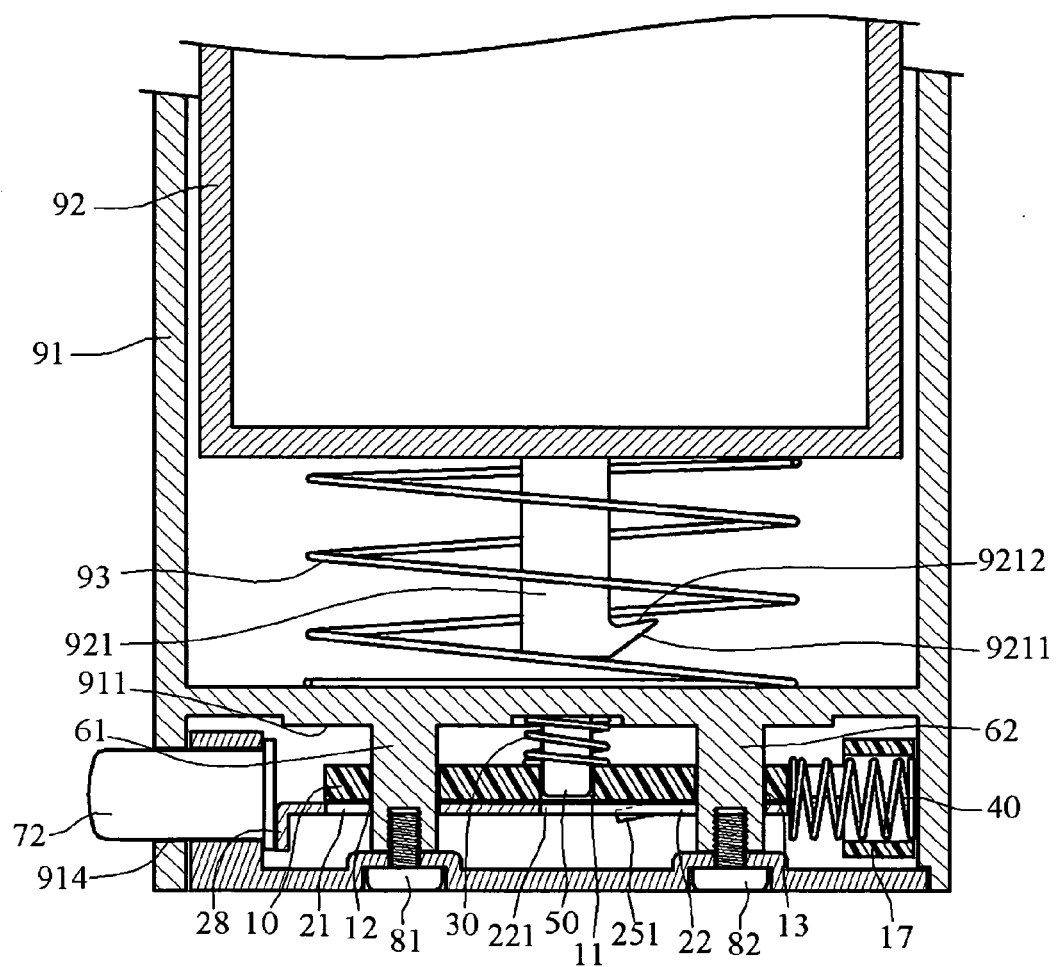
FIG. 6 is a sectional view of a mechanism using a locking mechanism of the invention.
Figure 7:
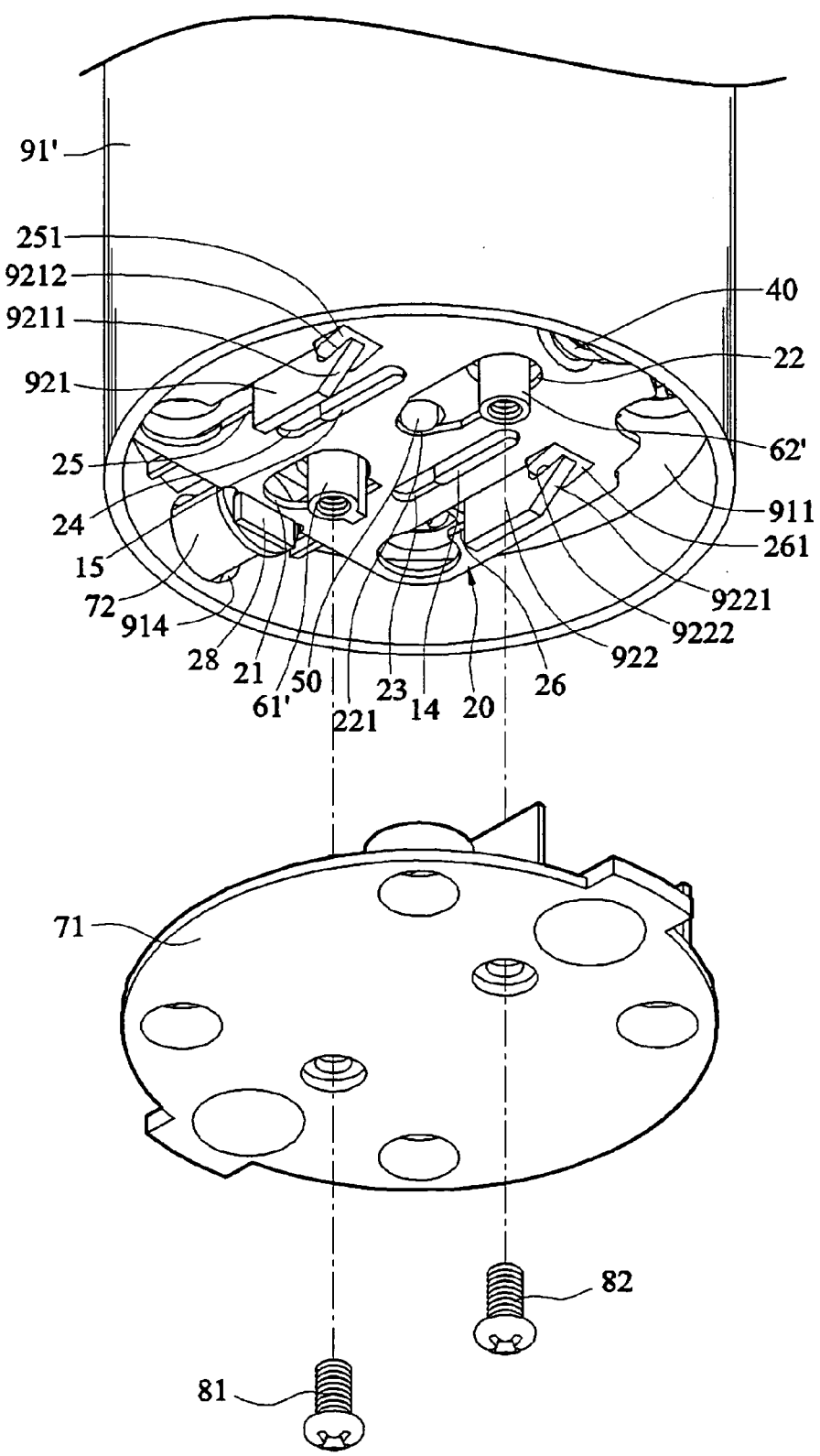
FIG. 7 is a partial perspective view of a mechanism using a locking mechanism of the invention.
Figure 8A:
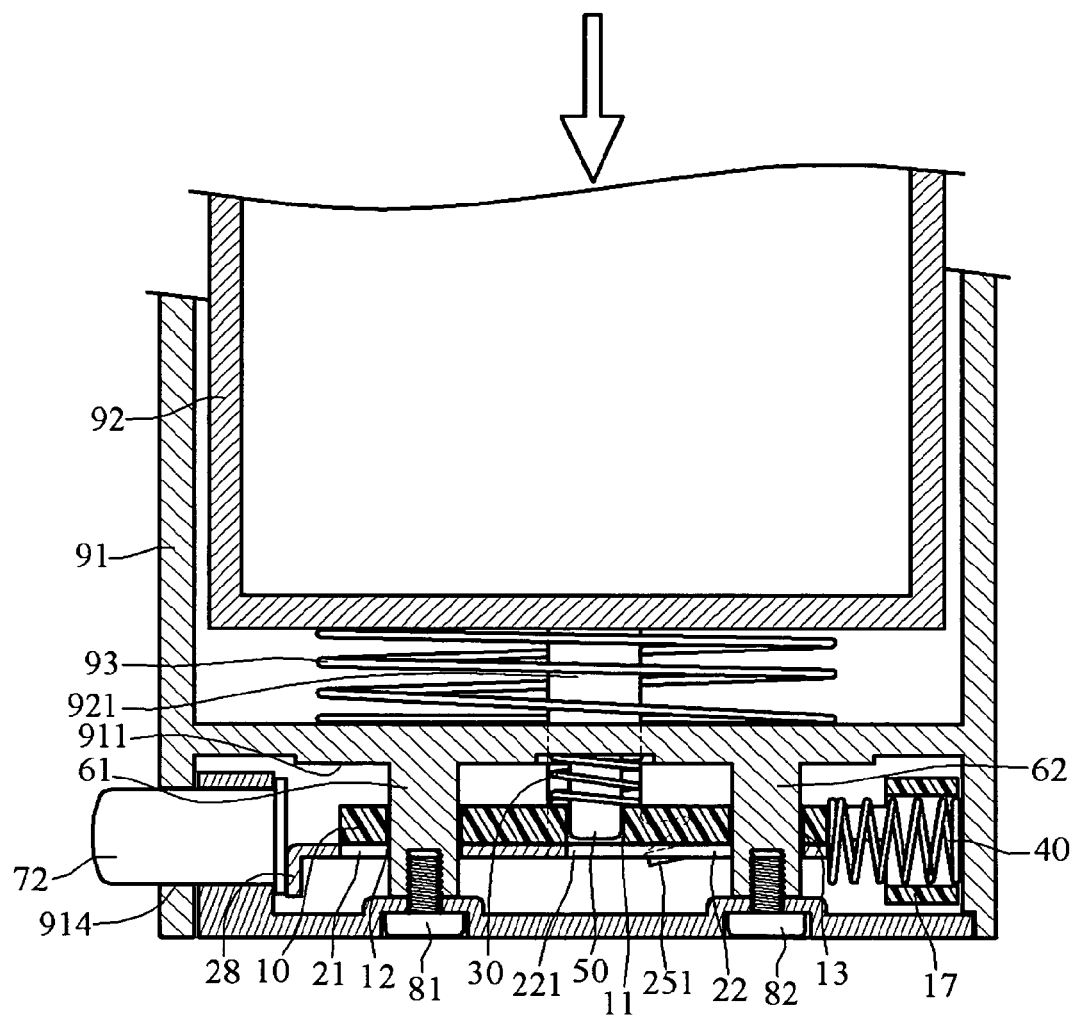
FIGS. 8A to 8F are operational views of a mechanism using a locking mechanism of the invention.
Figure 8B:
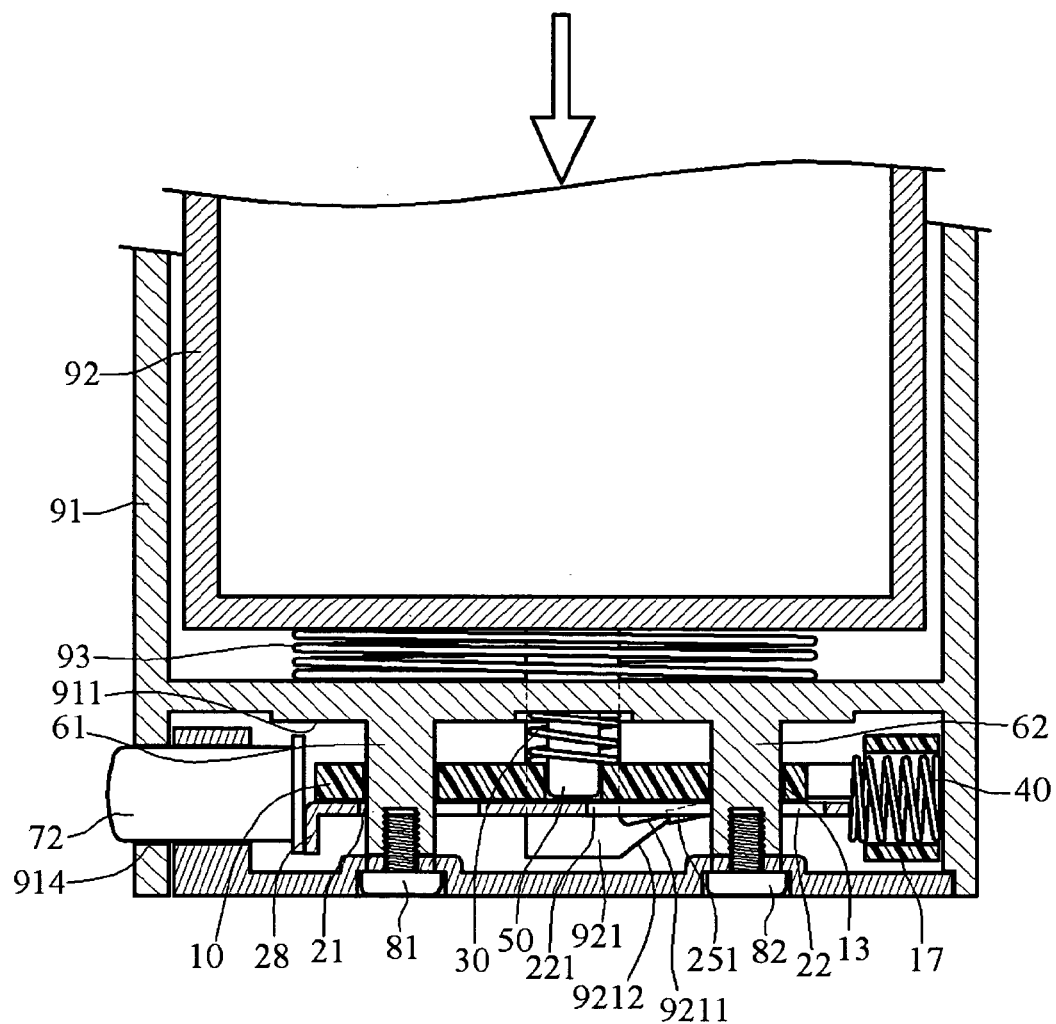
Figure 8C:
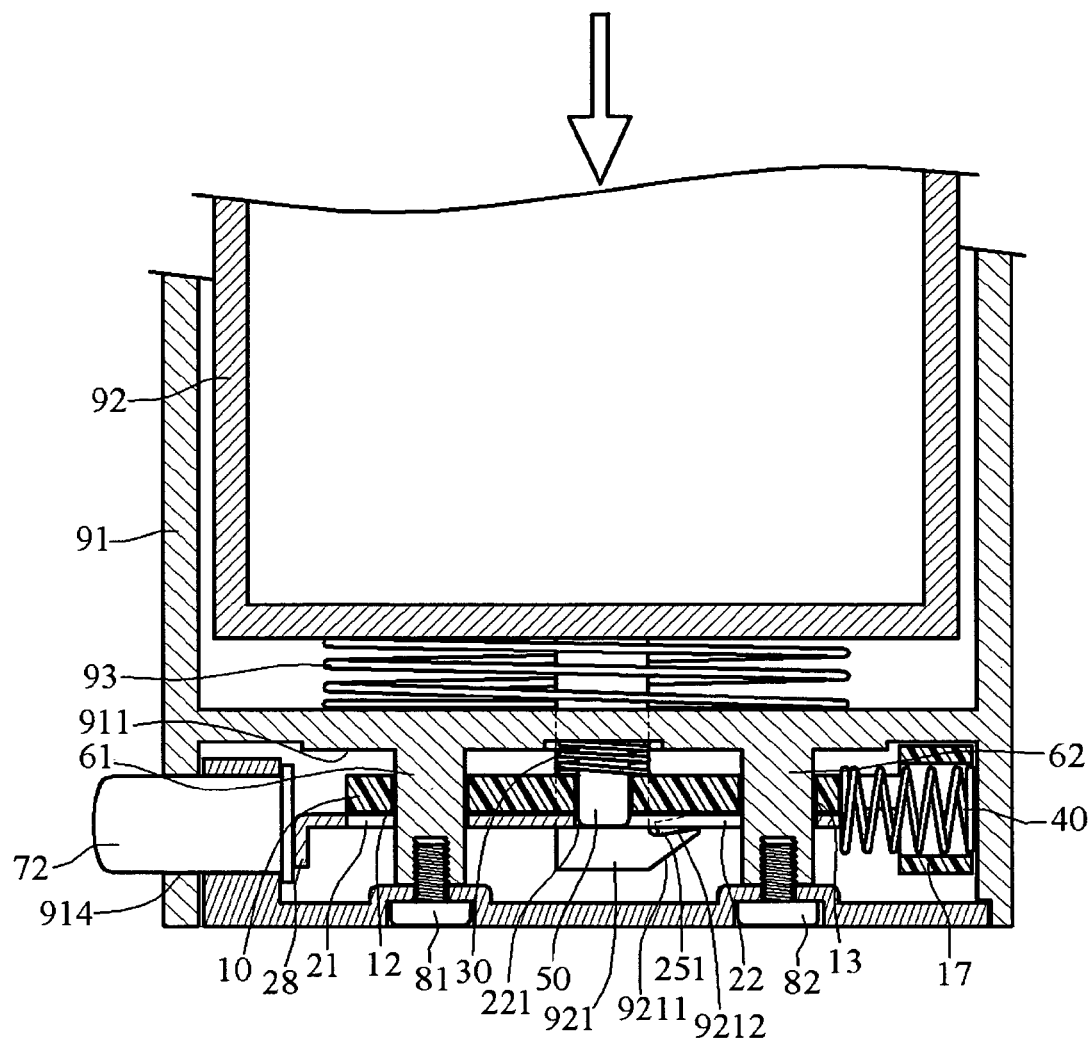
Figure 8D:
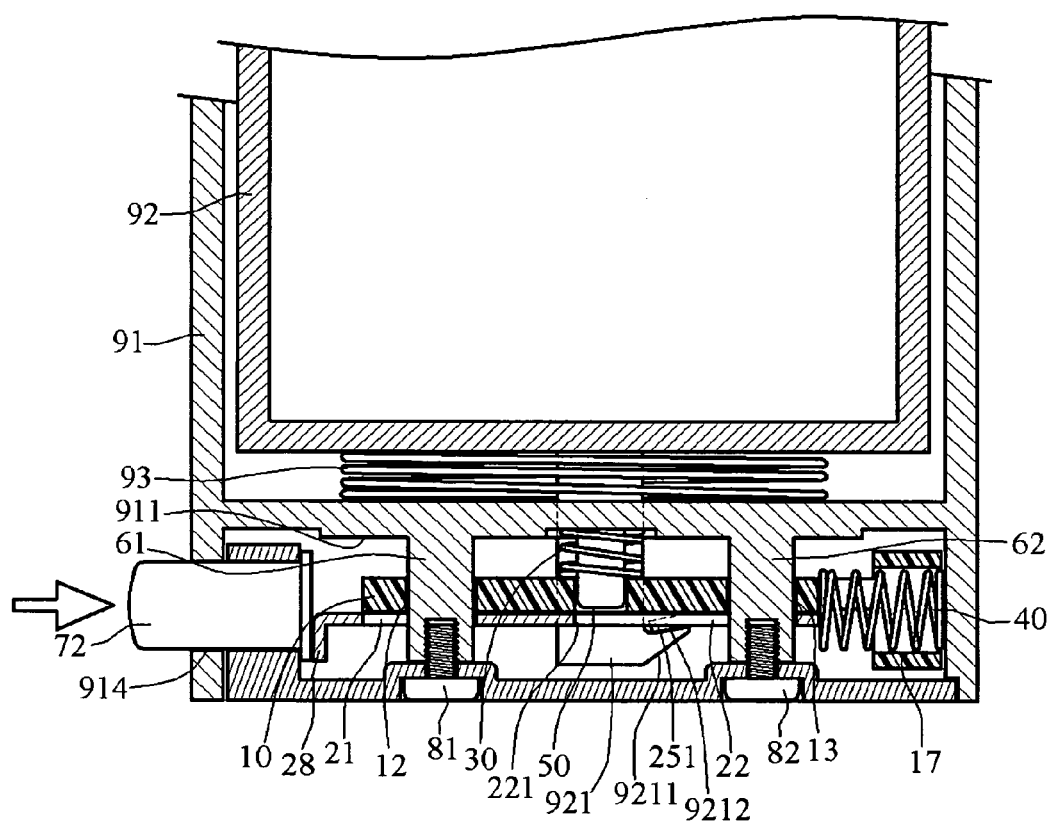
Figure 8E:
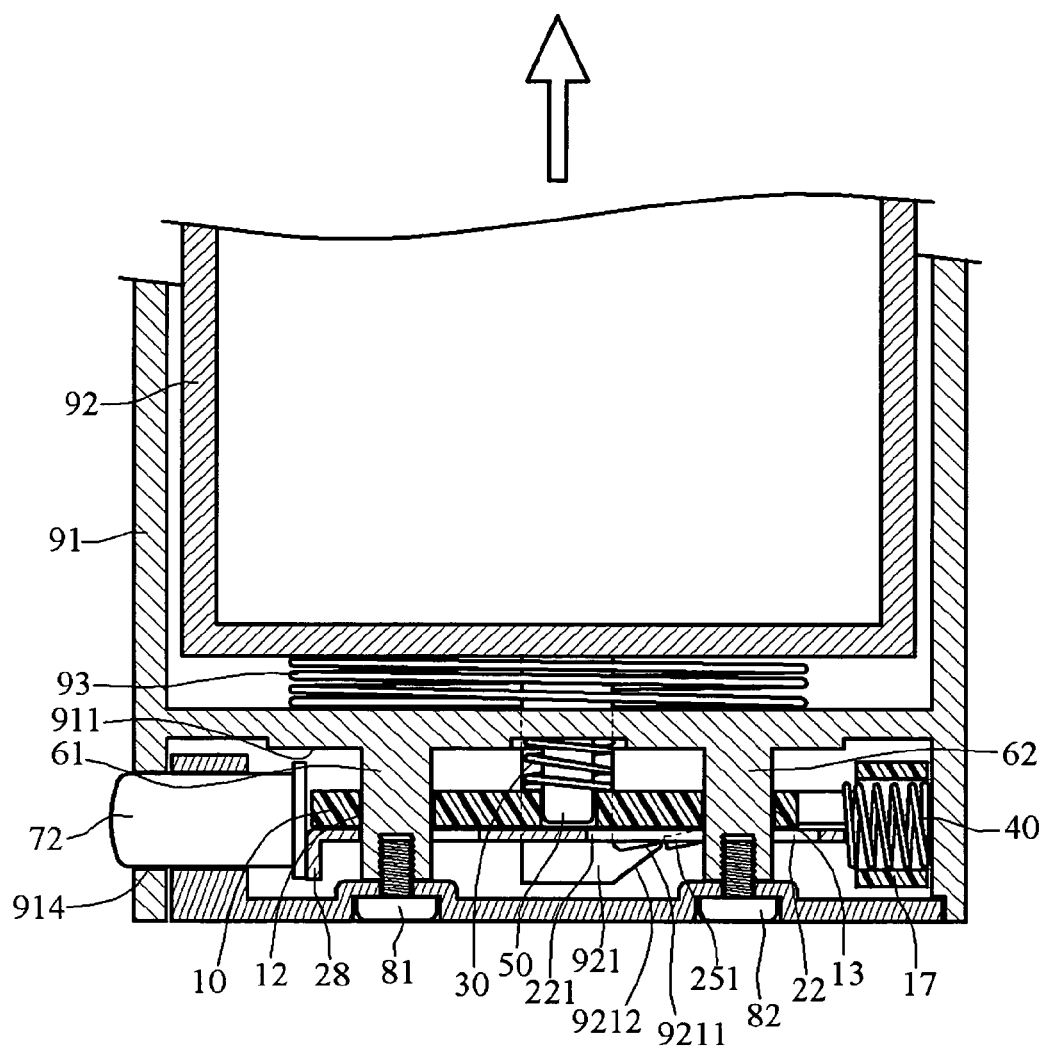
Figure 8F:
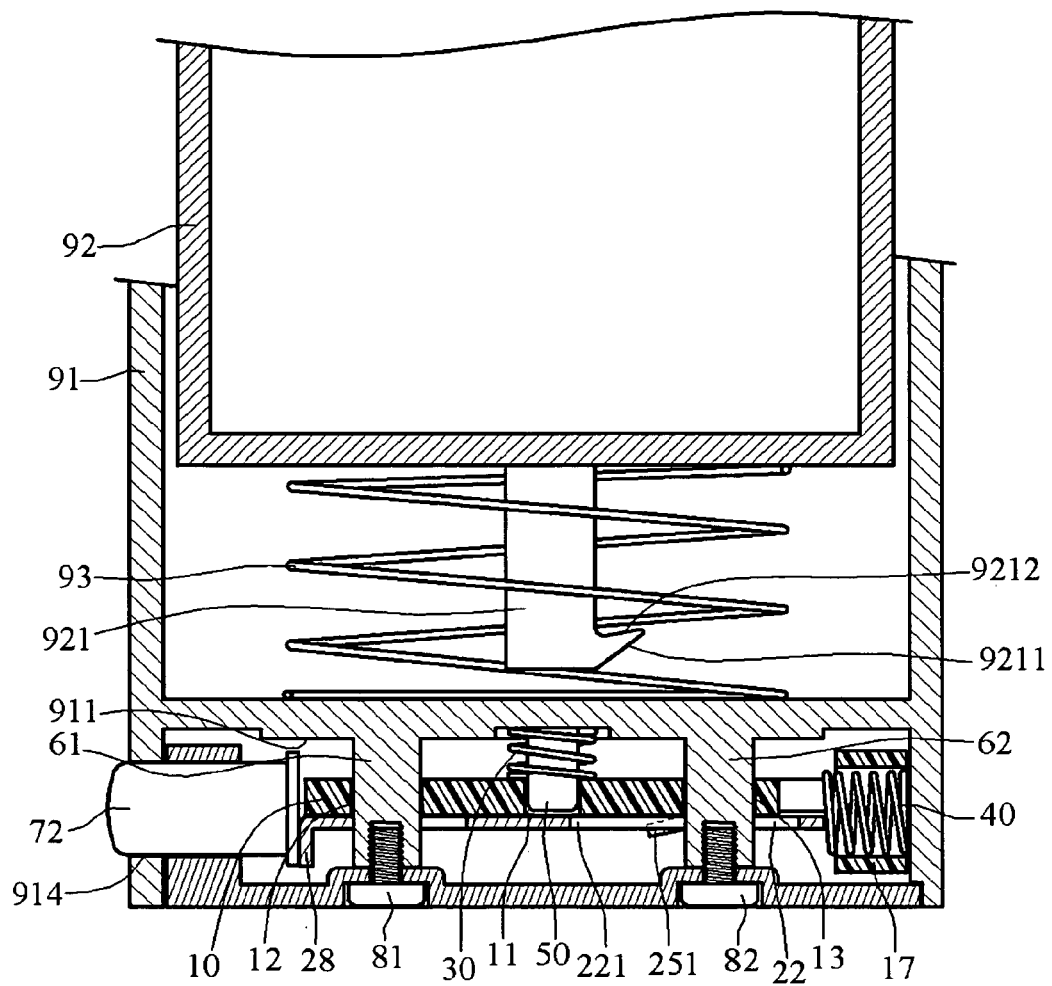

A preferred embodiment of the invention applied to a mechanism will be further described as follows with reference to FIGS. 5, 6 and 7. A retractable device 90 applied to the mechanism includes a first element 91, a second element 92 and a spring 93.

The first element 91' is a cylindrical element having a front end and a rear end. Adjacent to the rear end, there is a partition 911 for forming a space 913. Around the center of the partition, there is a sleeve hole 9113 for mounting a stopping rod 50. On both sides of the sleeve hole 9113, there are two guiding rods 61', 62' having inner threads. The guiding rod 61' also includes a guiding block 611. There are holes 9111, 9112 formed outside the guiding rods 61', 62'. There is also a hole 914 formed on circumferential wall of the first element 91' and aligned with the guiding rods 61', 62'.

The second element 92 is a cylindrical element corresponding to the first element 91' and having a connection end and an insertion end. The connecting end is equipped with hooks, screws or other connecting means for mounting an LCD display or other appliances (not shown in the drawing). The outer diameter of the second element 92 is similar but smaller than the inner diameter of the first element 91' so that the insertion end can fit into the front end of the first element 91' and the first and the second element 91', 92 are linearly movable for adjusting the relative position. Two hooks 921, 922 extend from the insertion end of the second element 92. The hooks 921, 922 are formed with guiding slopes 9211, 9221 and hook portions 9212, 9222.

A first spring 93 is mounted in the first element 91' and pushing the second element 92 to keep the first and the second elements 91', 92 at their utmost distance normally. The second element 92 retracted only when an external force applies against the force of the first spring 93. When the second element 92 is retracted into the first element 91', the hook 921, 922 of the second element 92 pass through the holes 9111, 9112 into the space 913.

The locking mechanism includes a cover 71, a guide plate 10, a locking plate 20, a second spring 30, a third spring 40, a stopping rod 50, a pair of guiding rods 61', 62' and a button 72. The cover 71 engages with the rear end of the first element 91' and covers the space 913. The cover 71 is formed with through holes 711, 712 corresponding to the guiding rods 61', 62'. Screws 81, 82 pass through the through holes 711, 712 and screwed on the guiding rods 61', 62' for fastening the cover 71 to the rear end of the first element 91'.

The locking plate 20 is a metallic plate mounted in the space 913 and movable in the first and second directions. Two holes 21, 22 corresponding to the guiding rods 61', 62' are formed in the center portion of the locking plate 20. The hole 21 is further formed with a cutoff 211 corresponding to the guiding block 611 of the guiding rod 61'. One end of the hole 22 extends till corresponding to the stopping rod 50 and defined a stopping portion 221. The locking plate 20 is formed with rail slots 23, 24 on sides of the holes 21, 22; and two locking holes 25, 26 corresponding to the hooks 921, 922. There are slopes 251, 261 formed on ends of the locking holes 25, 26 in the first direction. On front and rear ends of the locking plate 20, there are a concave portion 27 and an end plate 28.

The guide plate 10 is a rectangular plate made of polymer material or the like. The guide plate 10 is mounted inside the space 913 and located between the partition 911 and the locking plate 20. In central portion of the guiding plate 10, there is a sleeve hole 16 corresponding to the sleeve hole 9113 of the partition 911. In center of the sleeve hole 16, there is a through hole 11 corresponding to the stopping rod 50. The guiding plate 10 is further foamed with two holes 12, 13 corresponding to the guiding rods 61', 62'. The hole 12 has a cutoff 121 corresponding to the guiding block 611 of the guiding rod 61'. One surface of the guide plate 10 is also formed with two rails 14, 15 extending in the first direction. A sleeve 17 is further formed on the guiding plate 10 and corresponds to the concave portion 27 of the locking plate 20.

To assemble the locking mechanism into the space 913 of the first element 91', the button 72 is first mounted in the hole 914. The second spring 30 is mounted in the sleeve hole 9113 of the partition 911. The third spring 40 is mounted in the sleeve of 17 of the guiding plate 10. The sleeve hold 16 faces the second spring 30. The holes 12, 13 pass the guiding rods 61', 62'. When assembling, the sleeve hole 16 of the guiding plate 10 corresponds to the sleeve hole 9113 of the partition 911. The rails 14, 15 face downward because the guiding block 611 and the cutoff 121 of the hole 12 are portions to guide the correct mounting direction. The guiding plate 10 mounted through the guiding rods 61', 62' is limited with only movable in the first direction along the guiding rods 61', 62', and unmovable in the second direction.

Further, placing the locking plate 20 into the space 913 and corresponding to the guiding plate 10. The holes 21, 22 and rail slots 23, 24 correspond to the guiding rods 61', 62' and rails 14, 15. The locking plate 20 is also in specific direction that the slopes 251, 261 face downwards. The mounting is guided by the cutoff 211 of the hole 21 corresponding to the guiding block 611 of the guiding rod 61'. The locking plate 20 is sleeved on the guiding rods 61', 62' through the holes 21, 22, and leaning to the guiding plate 10. The rails 14, 15 of the guiding plate 10 are therefore moving into the rail slots 23, 24. The length of the rail slots 23, 24 is larger than that of he rails 14, 15 of the guiding plate 10 so that the locking plate 20 is movable along the rail slots 23, 24 in the second direction in addition to the movement along the guiding rods 61', 62' in the first direction. The concave portion 27 and the end plate 28 correspond to the third spring 40 and the button 72 respectively. By force of the third spring 40, the locking plate 20 is normally moved to a latched position where the spring 40 is relieved from compression and the locking plate 20 moves the button 72 outward. When the button 72 being pressed inward, the locking plate 20 presses the third spring 40 and moves to an unlatched position. In the first direction, the locking plate 20 is further pressed by a second spring 30 for normally moving to a release position where the spring 30 is relieved. When an external force applies to press the second spring 30 and make the hole 22 of the locking plate 20 stopped by the stopping rod 50 and unmovable in the second direction, as in a safety position.

Finally, mount the cover 71 to the rear end of the first element 91' and enclose the space 913. A pair of screws 81, 82 pass through holes 711, 712 and fastened the cover 71 to the first element 91' on the guiding rods 61', 62'.

As shown in FIGS. 8A, 8B, 8C, 8D, 8E and 8F, by means of the first spring 93, second spring 30 and the third spring 40, the first and second elements 91', 92 are normally kept in utmost distance in the first direction. The locking plate 20 is normally in the release position in the first direction and in the latched position in the second direction. By pressing the second element 92 to compress the first spring 93, the second element 92 is retracted to the first element 91' and reduced with the distance between them. After continuous retraction, the hooks 921, 922 of the second element 92 pass through the holes 9111, 9112 and the guiding plate 10, and touch the front sides of the locking holes 25, 26 of the locking plate 20. By further retraction of the second element 92, the slopes 9211, 9221 of the hooks 921, 922 press the locking plate toward the unlatched position. After the hooks 921, 922 pass the locking plate 20, the third spring 40 relieves the locking plate 20 back to the latched position where the hook portions 9212, 9222 of the hooks 921, 922 latch on the slope 251, 261 of the locking plate 20. When the external force is removed, the relieving force of the first spring 93 presses the second element 92 and gives a first force $F_1$ to the locking plate 20. The first force $F_1$ presses the second spring 30 and moves the locking plate 20 to the safety position where the stopping rod 50 gets into the hole 22 of the locking plate 20 and is limited by the stopping portion 221 so as to be unmovable in the second direction. The compression force of the second spring 30 is defined as $F_2$, then $F_1 > F_2$. In the safety position, user cannot press the button 72 inward to release the hooks 921, 922 from the locking plate 20 so that any unintentional touch to the button 72 cannot unlatch the locking plate 20. Practically, the retractable device 90 of the invention is applicable to an LCD panel (not shown in the drawings) for supporting the panel and adjusting the height. For delivery, in order to reduce the package dimensions, the retractable device 90 and the LCD panel are separated, and the second element 92 is retracted into the first element 91'. As described above, the second element 92 is then latched by the locking plate 20. The exposed button 72 cannot be moved by any intentional of accidental force. Therefore, when user unpacks the product, the second element 91' will not come out and hurt people.

When placing the LCD panel on the retractable device 90, the LCD panel provides a gravitational force to overcome the force of the first spring 93 in the first direction so as to move the hooks 921, 922 downward. Then the second spring 30 relieves the locking plate 20 to the unlatched position, and the button 72 can be pressed down. By means of the guiding blocks 251, 261 and the guiding slopes 9211, 9221, the locking plate 20 is moved to the unlatched position, the second element 92 is released from the first element 91'. The weight of the LCD panel prevents the second element 92 from prompt release. And, the relative position of first and second elements 91', 92 can be adjusted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A locking mechanism, comprising:

a guiding plate, movable in a first direction;

a second spring mounted in said first direction and supports said guiding plate movable between a release position where said second spring is relieved, and a safety position where said second spring is pressed; said guiding plate being formed with a hole;

a locking plate, mounted to said guiding plate to be movable in a second direction perpendicular to said first direction, and movable in accompany with said guiding plate in said release position and said safety position in said first direction, wherein said guiding plate is formed with a pair of rails extending in said first direction; said locking plate being formed with rail slots for receiving said rails and movable in said second direction;

a third spring mounted in said second direction and supporting said locking plate to be movable in a latched position where said third spring is relieved, and a unlatched position where said third spring is pressed; said locking plate being formed with a stopping portion correspondent to said hole of the guiding plate, and at least a locking hole;

a stopping rod, mounted in said first direction and correspondent to said hole of the guiding plate and said stopping portion; said stopping rod coming into said hole and said stopping portion in said safety position, and released from said stopping portion in said release position; and at least a hook, correspondent to said hole of the guiding plate and passing through a first spring opposed to a pressing force of said second spring; wherein said hook hooks on said locking hole in said latched position by force of said second spring; wherein said locking plate is unmovable in said second direction when said first spring presses said second spring and moves said locking plate into said safety position; and wherein said locking plate is retrieved to said release position when an external force is applied to said first spring to let said second spring release said locking plate to be movable in said second direction, and then said hook is released from said locking plate by force of said first spring when an external force is applied to said locking plate to press said third spring and move to said unlatched position.

2. The locking mechanism according to claim 1, further comprising a pair of guiding rods for guiding said guiding plate and said locking plate moving along said first direction; lengths of said guiding rods being longer than that of said stopping rod.

3. The locking mechanism according to claim 1 wherein said locking hole is formed with a slope at one side thereof and extended in said first direction.

* * * * *